US007600699B2

(12) United States Patent

Kah, Jr. et al.

(10) Patent No.: US 7,600,699 B2
(45) Date of Patent: Oct. 13, 2009

(54) SPRINKLER TOP WITH CO-MOLDED SEAL FOR RISER AND BODY

(75) Inventors: Carl L. C. Kah, Jr., North Palm Beach, FL (US); Richard Zhang, Riviera Beach, FL (US)

(73) Assignee: K-Rain Manufacturing Corp., Riviera Beach, FL (US)

( * ) Notice: Subject to any disclaimer, the term of this patent is extended or adjusted under 35 U.S.C. 154(b) by 0 days.

(21) Appl. No.: 11/438,634

(22) Filed: May 22, 2006

(65) Prior Publication Data

US 2006/0261182 A1 Nov. 23, 2006

Related U.S. Application Data

(60) Provisional application No. 60/682,996, filed on May 20, 2005.

(51) Int. Cl.

| | |
|---|---|
| ***B05B 15/10*** | (2006.01) |
| ***B05B 15/06*** | (2006.01) |
| ***B05B 3/00*** | (2006.01) |
| ***F16J 15/32*** | (2006.01) |
| ***F16J 15/16*** | (2006.01) |

(52) U.S. Cl. ....................... 239/203; 239/123; 239/204; 239/205; 277/549

(58) Field of Classification Search ................. 239/205, 239/203, 204, 123, 200, 201, 206; 277/549, 277/550, 572

See application file for complete search history.

(56) References Cited

U.S. PATENT DOCUMENTS

| | | | | | |
|---|---|---|---|---|---|
| 3,724,757 | A | * | 4/1973 | Hunter | 239/205 |
| 3,921,910 | A | * | 11/1975 | Hayes et al. | 239/205 |
| 4,316,579 | A | * | 2/1982 | Ray et al. | 239/123 |
| 4,682,732 | A | * | 7/1987 | Walto | 239/123 |
| 4,787,558 | A | * | 11/1988 | Sexton et al. | 239/205 |
| 5,058,806 | A | * | 10/1991 | Rupar | 239/205 |
| 5,086,977 | A | * | 2/1992 | Kah, Jr. | 239/205 |
| 5,222,669 | A | * | 6/1993 | Lawson | 239/205 |
| 5,779,148 | A | * | 7/1998 | Saarem et al. | 239/104 |
| 5,988,523 | A | * | 11/1999 | Scott | 239/114 |
| 6,082,632 | A | * | 7/2000 | Clark et al. | 239/205 |

* cited by examiner

*Primary Examiner*—Darren W Gorman
(74) *Attorney, Agent, or Firm*—Ostrolenk Faber LLP

(57) ABSTRACT

A top for a pop-up type irrigation sprinkler that utilizes a riser that pops up from a stationary sprinkler body in accordance with an embodiment to the present invention includes a cap which is threadedly attached to the sprinkler body; a co-molded seal positioned in a center of the cap with a riser opening in the center thereof, wherein the seal prevents water from leaking out of the sprinkler between the cap and the sprinkler body and between the seal and the riser.

16 Claims, 8 Drawing Sheets

SECTION E-E

SECTION F-F

SECTION G-G

SPRINKLER TOP WITH CO-MOLDED SEAL FOR RISER AND BODY

CROSS-REFERENCE TO RELATED APPLICATION

This application claims the benefit of the priority of Provisional Application No. 60/682,996 filed May 20, 2005, the contents of which are specifically incorporated by reference herein.

BACKGROUND

Sprinklers with co-molded (two shot) rubber seals that provide a seal between the riser and body of a sprinkler are known. However, these sprinklers do not have a design that allow for a co-molding manufacturing process that provides the rubber material for the riser seal as well as the seal between the top and sprinkler body.

U.S. Pat. No. 4,316,579 illustrates one example of a riser seal and discusses desirable features of the sprinkler riser seal. However, the riser seal of this patent does not provide a seal between the top and the sprinkler body.

Accordingly it is desirable to provide a sprinkler that avoids the problems noted above.

SUMMARY OF INVENTION

A top for a pop-up type irrigation sprinkler that utilizes a riser that is movable up and down in a stationary sprinkler body in accordance with an embodiment to the present invention includes a cap which is threadedly attached to the sprinkler body and a co-molded seal positioned in a center of the cap with a riser opening in the center thereof, wherein the seal prevents water from leaking out of the sprinkler between the cap and the sprinkler body and between the seal and the riser.

A co-molded seal for use in a riser type irrigation sprinkler that utilizes a cap connected to a stationary sprinkler body in accordance with an embodiment of the present invention includes at least one hard plastic portion formed in a first step of a two shot molding process and an elastic portion made of an elastic material that is formed to surround the hard plastic portion in a second step of the two step molding process, wherein the elastic portion provides a seal to prevent water from leaking out of the sprinkler between the cap and the sprinkler body and between the seal and the riser.

A method of making a co-molded seal for use in a riser type irrigation sprinkler that utilizes a cap connected to a stationary sprinkler body in accordance with an embodiment of the present application includes steps of forming a hard plastic portion of the co-molded seal in a mold in a first molding step, retaining the hard plastic portion of the co-molded seal in the mold, switching molding cores for use with the mold and forming an elastic portion of the co-molded seal in the mold in a second molding step, wherein elastic material surrounds the hard plastic material.

DETAILED DESCRIPTION

A sprinkler top configuration in accordance with the present invention utilizes a top that is manufactured such that the plastic material that is first shot in a portion of a mold is retained. Thereafter, the cores on both sides of the retained hard plastic portion are changed for use with the desired second shot of elastic material that is used as the sealing material to seal both the sprinkler riser and the sprinkler body. This co-molded seal configuration allows for manufacture of the sprinkler cover using a unitary seal that can be manufactured in a single tool with a two shot type molding machine that is well known in art. Further, using the two shot molding process, the amount of high cost thermoplastic rubber required is reduced and the rigid plastic provides support for the rubber portion to prevent the rubber portion from shrinking with age and interfering with proper function of the riser retraction into the sprinkler body.

Figure 1:
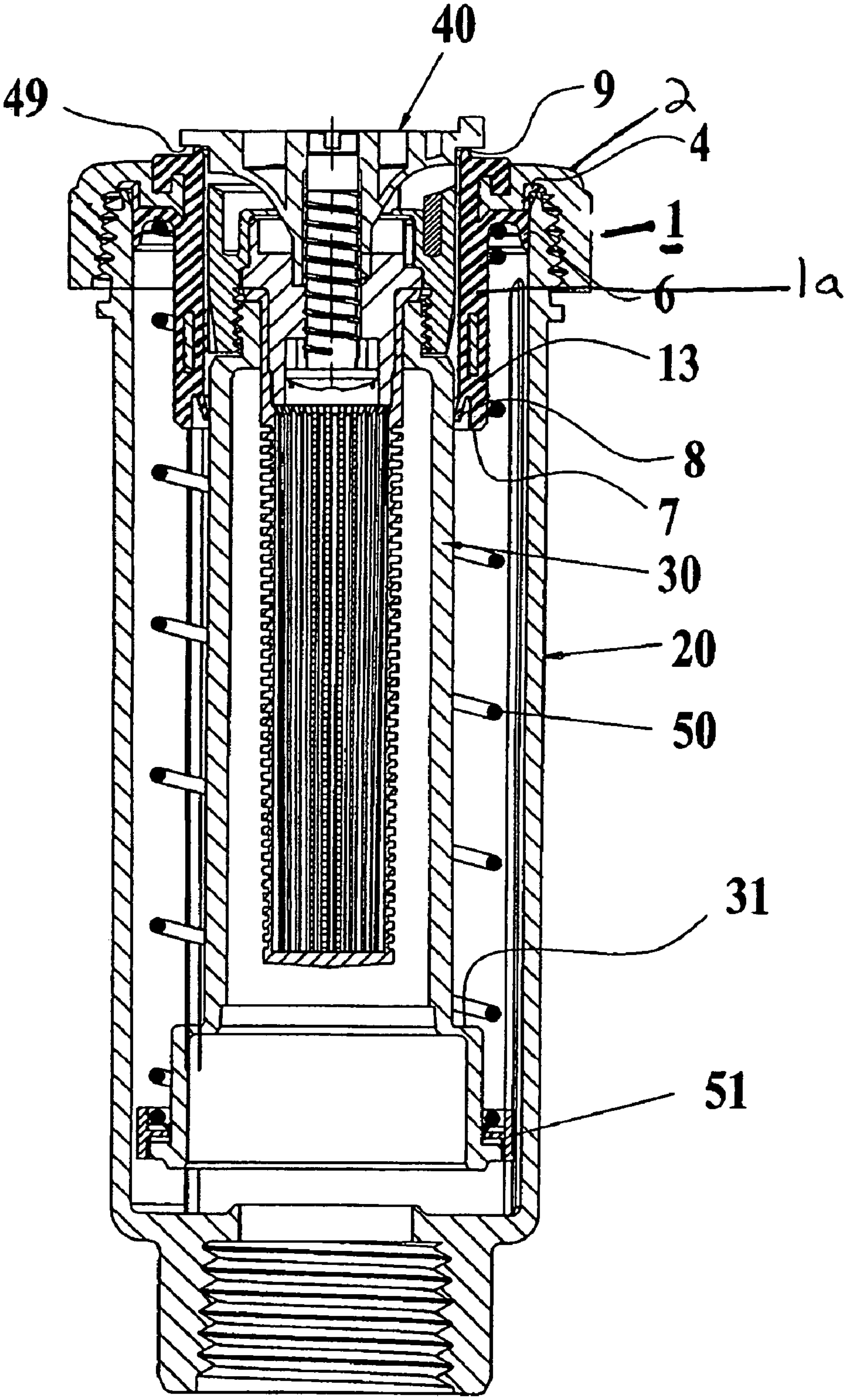
FIG. 1 shows a cross section of a sprinkler with the riser in the retracted position utilizing a top in accordance with an embodiment of the present application and showing the sealing interfaces.

FIG. 1 illustrates a sprinkler utilizing a top 1 including a co-molded seal 1*a* of the present application. The riser 30 is positioned in the stationary body 20 of the sprinkler. The spring 50 is utilized to bias the riser 30 into a retracted position, as illustrated in FIG. 1. In this position, the riser 30 is pushed down by spring 50 which is positioned between the ring 51 around the bottom of the riser 30 the under side of the top 1 of the sprinkler.

The under surface 49 of the nozzle top 40 contacts raised rib edge 9 of the rubber portion of the seal 1*a* of the top 1 to provide a seal to stop the further flow of water once the sprinkler riser 30 is retracted by spring 50 back into the body 20.

Lower internal seal lip 8 of the seal 1*a* provides low pressure sealing between the top 1 and the riser 30 during the period that pressure is rising in the sprinkler housing 20 and pushing the riser 30 upward out of the sprinkler body 20 to prevent any substantial water flow blow-by.

When the sprinkler riser 30 is fully up, high pressure sealing will be provided by the riser shoulder 31 being sealed against surface 7 around the bottom circumference of the seal 1*a* of the sprinkler top 1. This is a preferred configuration since the flat surface 31 is pressed by the high sprinkler operating pressure against the flat surface 7 around the bottom circumference of the rubber seal to provide a high pressure, leak tight seal. In contrast, conventional sprinklers typically utilize two conical shaped elements and typically stick one cone into the other taking advantage of the angular tolerance between the two cone shaped element to simplify production. That is, they do not utilize the riser shoulder 31 to form a tight seal with the top 1. As a result, in conventional sprinklers of this type, the riser tends to stick-up even after the pressure is turned off on the sprinkler.

Figure 2:
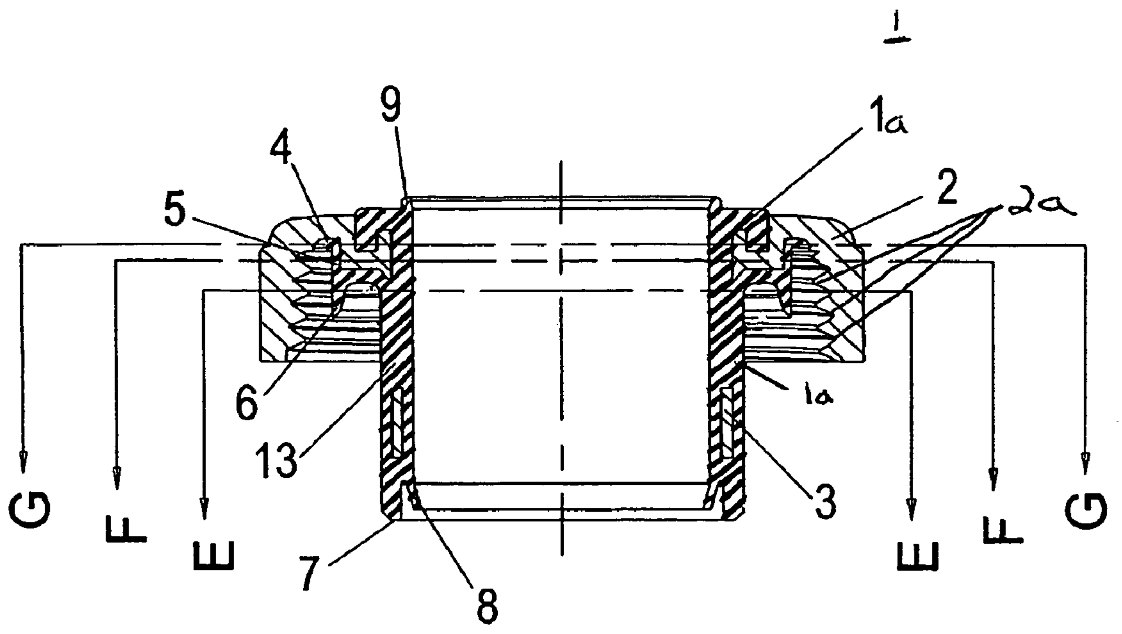
FIG. 2 is a cross section of the sprinkler top of FIG. 1 identifying section lines for subsequent figures and showing the co-molded rubber and plastic material portions of the seal.

FIG. 2 illustrates a cross section of the sprinkler top 1 of FIG. 1. As illustrated, the sprinkler top 1 preferably includes the cap 2 which is attached to the body 20 of the sprinkler, preferably utilizing the threads 2*a*. The seal 1*a* of the top 1 may be molded to the cap 2 if desired. The lip 4 of the seal ensures that water will not leak out between the top surface of the stationary body 20 of the sprinkler and the cap 2 when the cap is secured to the body 20. The flange 5 and lower lip 6 ensure that water will not leak between the sidewall of the body 20 and the cap 2 when the cap is secured to the body 20. Further, as noted above, the lower internal seal lip 8 ensures that water does not flow out of the sprinkler between the seal 1*a* and the riser 30. In the top 1 of FIG. 2, the riser 30 (FIG. 1) moves up and down through the seal 1*a* and is guided by the sidewalls 13 thereof. The outer surface of the sidewalls 13 are preferably made of an elastic flexible material. The seal 1*a* preferably includes a hard plastic ring 3 that is surrounded by the elastic material. The hard plastic ring 3 helps to add structural support to the elastic material, particularly in the area of the internal seal 8 as illustrated. The lines E-E, F-F, and G-G illustrated in FIG. 2 show the locations of the cross sections illustrated in FIGS. 4-6 which are described in further detain below.

Figure 3:
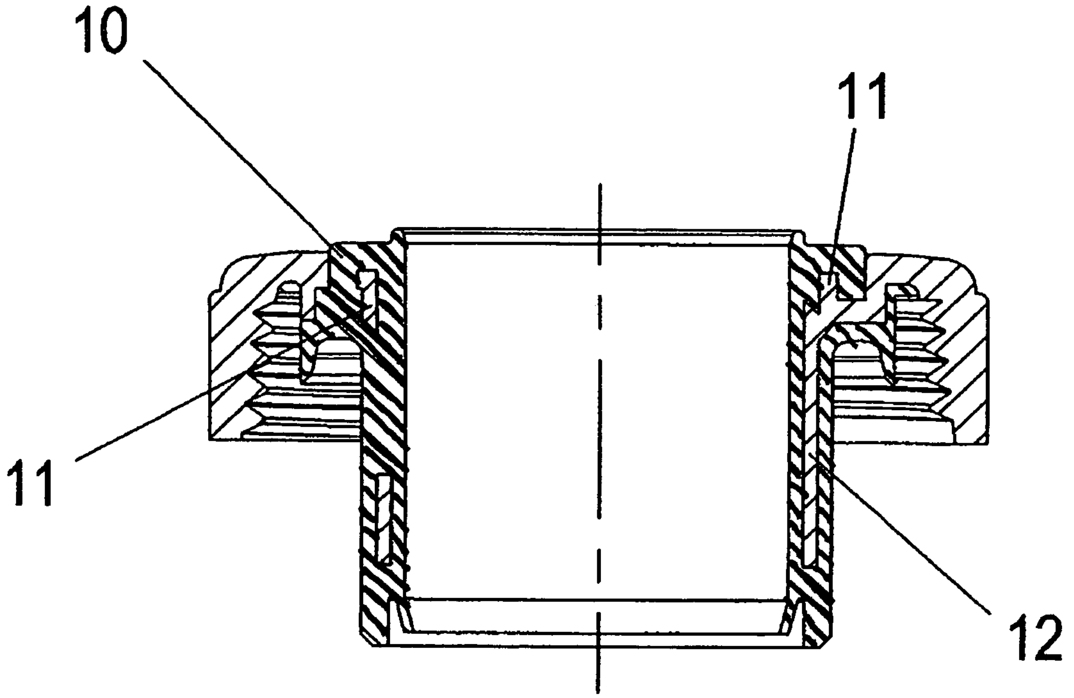
FIG. 3 is a cross section of the top of FIG. 1 identifying the plastic portion of the seal.

FIG. 3 illustrates a cross section of the top 1 in accordance with an embodiment of the present application, in which the reference numerals 11 and 12 are used to refer to the hard plastic portions of the seal 1*a* and reference numeral 10 refers to the elastic (or rubber) material surrounding the hard plastic portions. As can be seen in FIG. 3, the plastic ring 11 extends around the periphery of the seal 1*a* to provide structural support. The rib 12 is also made of hard plastic and supplies structural support in the vertical direction. The rib 12 may extend upward from the ring 3 of FIG. 2, for example if desired. The ring 11 will provide structural support for the elastic material near the top of the seal where the lip 4, flange 5, and lower flange 6 provide a seal between the top 1 and the body 20. The rib 12 (and ring 3) provide support for the elastic material in the area of the lower internal seal 8, for example.

Figure 4:
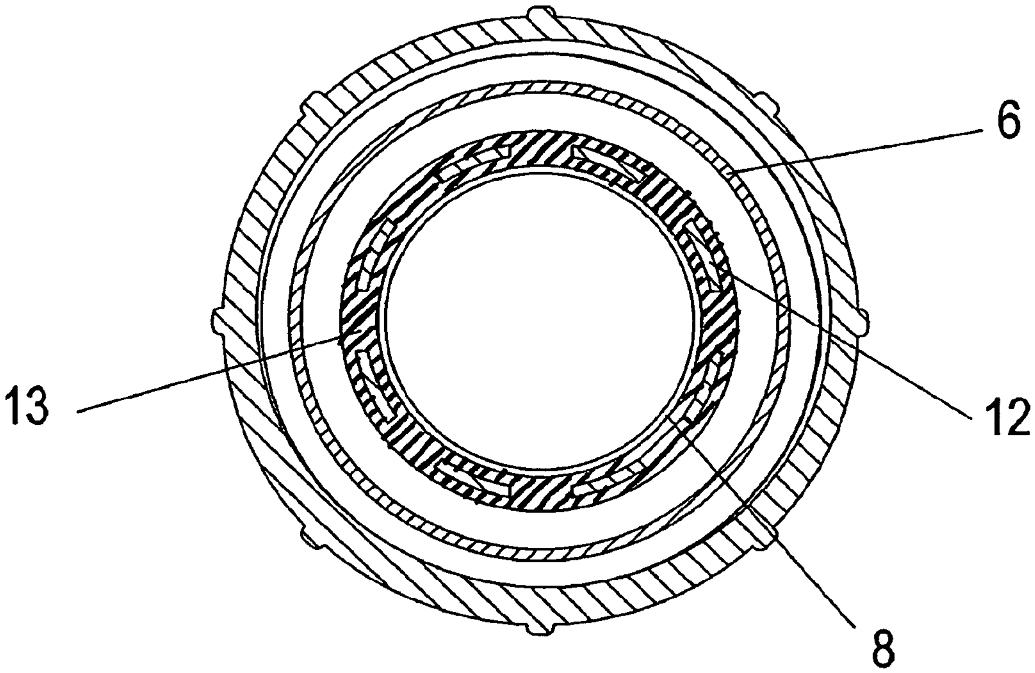
FIG. 4 is a sectional view on cut line E-E of FIG. 2 identifying the plastic and rubber portions of the co-molded seal.

FIG. 4 is an illustration of a cross section of the top 1 of FIG. 2 as viewed from line E-E. As illustrated, the plastic ribs 12 may be spaced apart and preferably positioned longitudinally in the sidewall 13 of the seal 1*a* and surrounded by elastic material. The lips 6 and 8, as noted above, are also preferably made of the elastic material so as to ensure a tight seal between the seal 1*a* and the sidewall of the body 20, and the riser 30, respectively.

Figure 5:
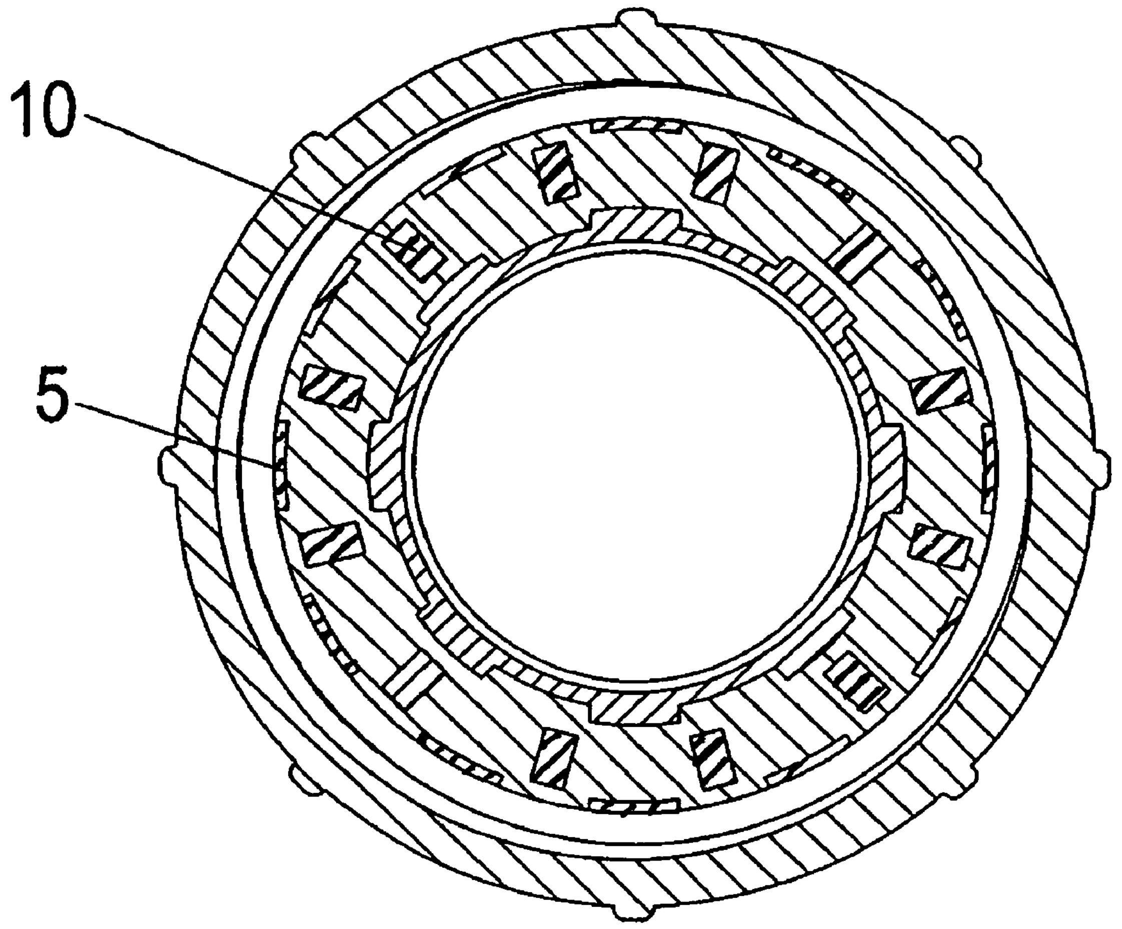
FIG. 5 is a sectional view on cut line F-F of FIG. 2 identifying the plastic and rubber portion of the co-molded seal.

FIG. 5 is an illustration of a cross section of the top 1 of FIG. 2 as viewed from line F-F. As can be seen in FIG. 5, the flange 5 may include protrusions that extend upward periodically as does the elastic material 10.

Figure 6:
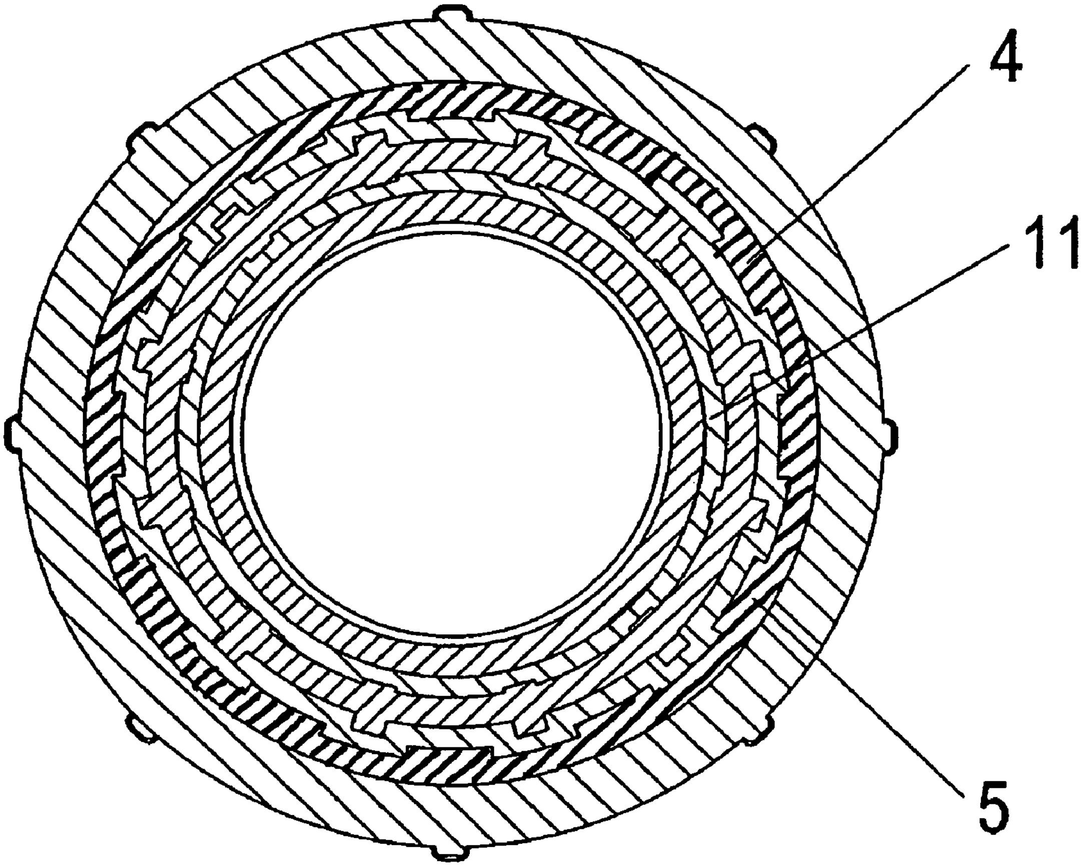
FIG. 6 is the cross section view on cut line G-G of FIG. 2 identifying the plastic and rubber portion of the co-molded seal.

FIG. 6 is an illustration of a cross section of the top of FIG. 2 as viewed from line G-G. Lip 4 is preferably made of the elastic material to ensure a good sea between the top 1 and the top surface of the sidewall of the body 20. As illustrated, the material that is used to form the lip 4 may be provided via the elastic material of flange 5.

Figure 7:
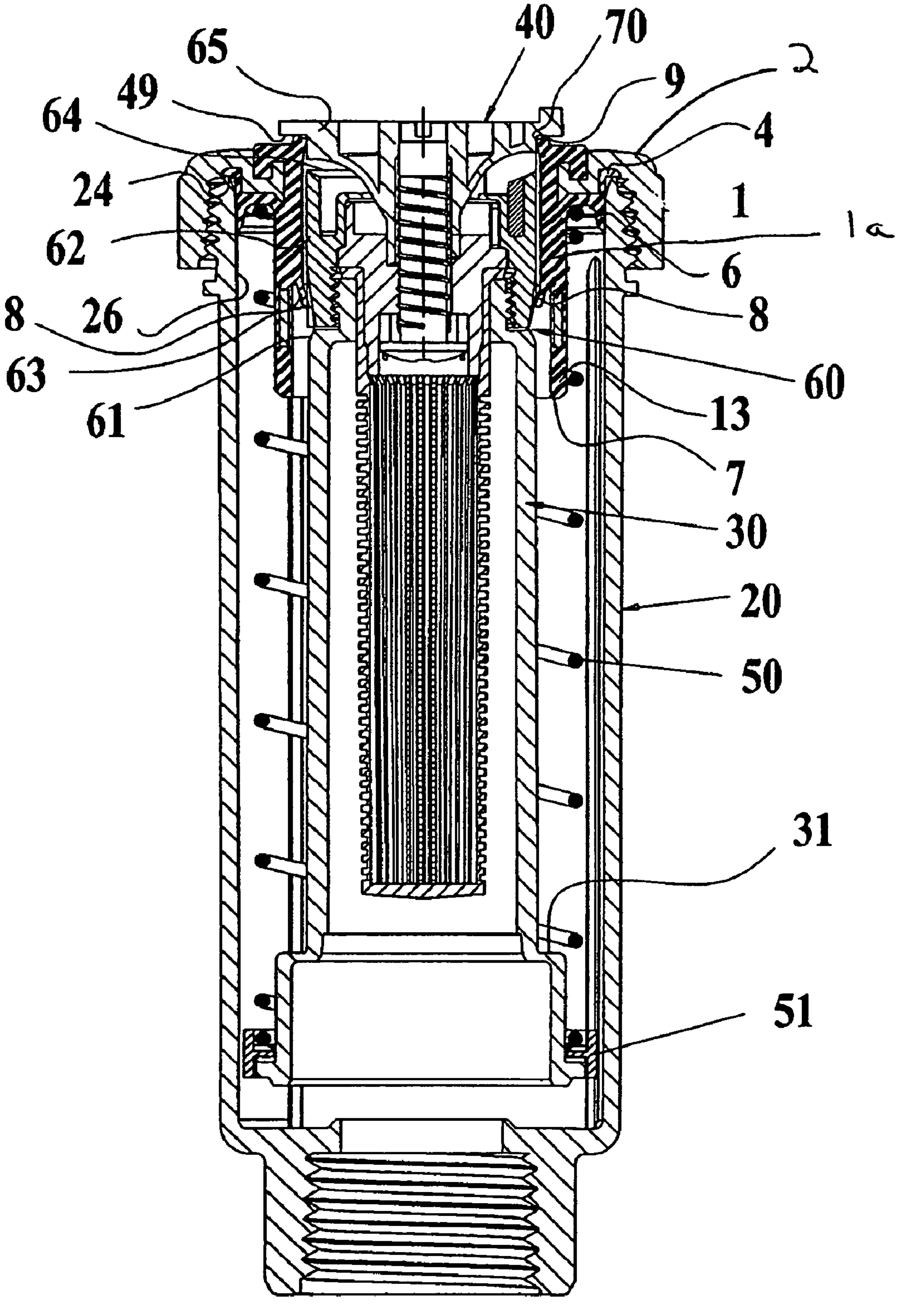
FIG. 7 shows a cross sectional view a sprinkler including another embodiment of the top of the present application with an upper grit wiper seal added and purge flow opening provided by raising location of low pressure internal seal.

FIG. 7 shows a cross section view of a sprinkler utilizing a top 1 with a shortened seal 1*a* in accordance with another embodiment of the present application. As illustrated, the lower internal seal lip 8 of the seal 1*a* in FIG. 7 which provides low pressure sealing between the top 1 and the riser 30 and provides minimum resistance when the spring 50 retracts the riser 30 when sprinkler pressure is turned off, is positioned above a joint 60 where the spray nozzle 40 is attached to the riser 30.

During manufacture of the riser 30 and/or the nozzle housing 62, a bevel and/or slots 63 may be provided either on the riser or nozzle housing to provide a momentary purge flow around the water activated low pressure internal riser seal 8 during the up stroke of the riser to allow flushing any grit or foreign material out of the upper portion of the seal. During the upward movement of the riser 30, while the sprinkler is pressurizing, the under surface 49 is now lifted off the rib edge 9 (see FIG. 1) or the grit wiper lip seal 70 at the upper end of the seal 1*a* as shown in FIG. 7. Thus, the purge flow can pass around the nozzle housing 62 due to slot 64 around the outside of the nozzle housing 62 and through the opening between the nozzle top piece 65 and the housing 62 as shown in FIG. 7.

The upper end grit wiper seal lip 70 is upwardly directed and surrounds the riser 30 and nozzle housing 62 and scrapes the stem of the riser clean during pop-down of the riser when the water pressure is turned off.

This tends to minimize the dirt being pulled back into the seal during retraction and that which can be easily purged out again upon re-pressurizing as described.

Figure 8:
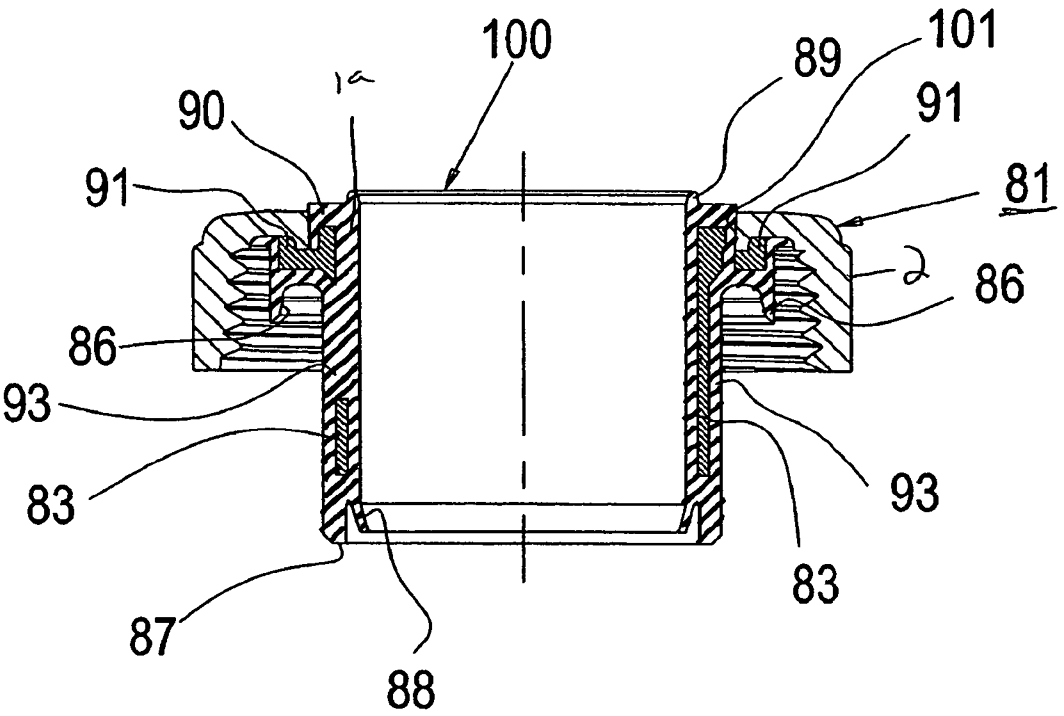
FIG. 8 shows a top in accordance with another embodiment of the present application including a cartridge co-molded unitary seal.

As shown in FIG. 8, in accordance with an embodiment of the present application, the top 81 (similar to top 1 of FIG. 1) may be separated from the co-molded (two-shot) unitary seal 1*a* which is embodied in cartridge 100. The top 81 simply includes a hole 101 in which the co-molded seal cartridge 100 is inserted into.

The co-molded seal cartridge 100 includes a supporting hard plastic ring 91 around the outside which can be retained in a portion of the mold during the two shot molding process along with plastic support core 83. After the ring is molded, core changes are performed on both sides of the hard plastic support core 83 and the ring 91 which are to be covered with the elastic seal material during the second shot of the two-shot plastic molding machine process.

This seal cartridge 100 then is able to be manufactured in a single two shot molding machine process to include both the desired riser low pressure lip seal 88, high pressure static circumferential to riser seal surface 87 of the elastic seal material and the sprinkler housing lip seal 86 on the single unitary seal cartridge for sealing between the riser and the housing.

This seal cartridge is also shown with lip 89 angled inward to provide a riser down stroke wiper seal.

What is claimed is:

1. A top for a pop-up type irrigation sprinkler that utilizes a riser that pops up from a stationary sprinkler body, the top comprising:

a cap which is threadedly attached to the sprinkler body; and a co-molded seal positioned in a center of the cap with a riser opening in the center thereof, wherein the seal prevents water from leaking out of the sprinkler between the cap and the sprinkler body and between the seal and the riser, the co-molded seal including at least one hard plastic portion having an outer circumference and an inner circumference, wherein the outer circumference and the inner circumference are covered with an elastic material.

2. The top of claim 1, wherein the at least one hard plastic portion is formed in a first step of a two shot molding process and the elastic material is formed in a second step of the two step molding process.

3. The top of claim 1, wherein the co-molded seal comprises an internal lip seal positioned on a bottom of the co-molded seal and inclined inward into the riser opening to provide a low-pressure seal between the co-molded seal and the riser.

4. The top of claim 1, wherein the co-molded seal comprises a flat surface on a bottom thereof operable to cooperate with a ring on a bottom of the riser to provide a high pressure seal between a bottom surface of the co-molded seal and the riser.

5. The top of claim 1, wherein the co-molded seal further comprises a body sealing lip extending from a top part thereof to provide a seal between the cap and a top surface of the sprinkler body.

6. The top of claim 1, wherein the co-molded seal further comprises a flange and a lower lip, below the flange, spaced laterally from a top part of the co-molded seal to provide a seal between the cap and a sidewall of the sprinkler body.

7. The top of claim 1, wherein the co-molded seal further comprises an edge positioned on a top surface of the co-molded seal to prevent water from leaking between a nozzle top attached to a top of the riser and the top when the riser is retracted into the sprinkler body.

8. The top of claim 1, wherein the co-molded seal is formed separately as a cartridge such that the cartridge is positioned in a cartridge opening in the cap to prevent leakage between the cap and the sprinkler body and between the co-molded seal and the riser.

9. The top of claim 2, wherein a second hard plastic portion is formed in the co-molded seal near a top of the co-molded seal to provide structural support and aid in preventing water from leaking between the cap and the sprinkler body.

10. A co-molded seal for use in a pop-up type irrigation sprinkler that utilizes a riser that pops up and down in a cap connected to a stationary sprinkler body, the co-molded seal comprising:

at least one hard plastic portion formed in a first step of a two shot molding process; and an elastic portion made of an elastic material that is formed to surround the hard plastic portion in a second step of the two step molding process such that an outer circumference and an inner circumference of the hard plastic portion is covered with the elastic material, wherein the elastic portion provides a seal to prevent water from leaking out of the sprinkler between the cap and the sprinkler body and between the seal and the riser.

11. The co-molded seal of claim 10, wherein the co-molded seal further comprises an internal lip seal positioned on a bottom of the co-molded seal and inclined inward into a riser opening formed in the co-molded seal to provide a low pressure seal between the co-molded seal and the riser to prevent water from leaking therebetween.

12. The top of claim 10, wherein the co-molded seal comprises a flat surface on a bottom thereof operable to cooperate with a ring on a bottom of the riser to provide a high pressure seal between a bottom surface of the co-molded seal and the riser.

13. The top of claim 10, wherein the co-molded seal further comprises a body sealing lip extending from a top part thereof to provide a seal between the cap and a top surface of the sprinkler body.

14. The top of claim 10, wherein the co-molded seal further comprises a flange and a lower lip, below the flange, spaced laterally from a top part of the co-molded seal to provide a seal between the cap and a sidewall of the sprinkler body.

15. The top of claim 10, wherein the co-molded seal further comprises an edge positioned on a top surface of the co-molded seal to prevent water from leaking between a nozzle top attached to a top of the riser and the cap when the riser is retracted into the sprinkler body.

16. The co-molded seal of claim 10, wherein the co-molded seal is formed separately as a cartridge such that the cartridge is positioned in a cartridge opening in the cap to prevent leakage between the cap and the sprinkler body and between the co-molded seal and the riser.

* * * * *